US012671853B2

(12) United States Patent
Ishikawa et al.

(10) Patent No.: US 12,671,853 B2
(45) Date of Patent: Jun. 30, 2026

(54) TRANSMISSION DEVICE, RECEPTION DEVICE, AND TRANSMISSION/RECEPTION SYSTEM

(71) Applicant: THINE ELECTRONICS, INC., Tokyo (JP)

(72) Inventors: Mio Ishikawa, Tokyo (JP); Shun Ideguchi, Tokyo (JP)

(73) Assignee: THINE ELECTRONICS, INC., Tokyo (JP)

( * ) Notice: Subject to any disclaimer, the term of this patent is extended or adjusted under 35 U.S.C. 154(b) by 0 days.

(21) Appl. No.: 19/114,891

(22) PCT Filed: Oct. 3, 2023

(86) PCT No.: PCT/JP2023/036098

§ 371 (c)(1),
(2) Date: Mar. 25, 2025

(87) PCT Pub. No.: WO2024/075743

PCT Pub. Date: Apr. 11, 2024

(65) Prior Publication Data

US 2026/0101071 A1    Apr. 9, 2026

(30) Foreign Application Priority Data

Oct. 4, 2022    (JP) ................................. 2022-160464

(51) Int. Cl.
H04N 21/235        (2011.01)
H04L 25/02        (2006.01)
        (Continued)

(52) U.S. Cl.
CPC ........... H04N 21/235 (2013.01); H04L 25/02 (2013.01); H04N 21/238 (2013.01); H04N 21/435 (2013.01)

(58) Field of Classification Search
None
See application file for complete search history.

(56) References Cited

U.S. PATENT DOCUMENTS

| | | | |
|---|---|---|---|
| 2017/0033920 A1* | 2/2017 | Takeuchi | ......... H04N 21/23602 |
| 2017/0150083 A1 | 5/2017 | Kim et al. | |
| 2018/0047331 A1* | 2/2018 | Murata | .................... G09G 5/12 |

FOREIGN PATENT DOCUMENTS

| | | |
|---|---|---|
| JP | 2020-162094 A | 10/2020 |
| WO | 02/009443 A1 | 1/2002 |

(Continued)

OTHER PUBLICATIONS

International Preliminary Report on Patentability dated Apr. 17, 2025 with a Translation of the Written Opinion of the International Searching Authority in Application No. PCT/JP2023/036098.

(Continued)

*Primary Examiner* — Junior O Mendoza
(74) *Attorney, Agent, or Firm* — Sughrue Mion, PLLC

(57) ABSTRACT

This transmitting and receiving system comprises a transmitting device 10 and a receiving device. The transmitting device 10 comprises a combiner 40 and a transmitter 50. The combiner 40 inputs a DE signal, video data (active data, blank data), and non-video data, and combines the video data and the non-video data according to a predetermined rule to output combined data. The transmitter 50 inputs the combined data output from the combiner 40, inserts BS data and BE data into the combined data, and sends the combined data after insertion to the transmission line 30.

9 Claims, 7 Drawing Sheets

(51) Int. Cl.
H04N 21/238 (2011.01)
H04N 21/435 (2011.01)

(56) References Cited

FOREIGN PATENT DOCUMENTS

WO      2009/069430  A1      6/2009
WO      2010/008012  A1      1/2010
WO      2017/175828  A1     10/2017

OTHER PUBLICATIONS

International Search Report for PCT/JP2023/036098 dated Nov. 21, 2023.

* cited by examiner

TRANSMISSION DEVICE, RECEPTION DEVICE, AND TRANSMISSION/RECEPTION SYSTEM

CROSS REFERENCE TO RELATED APPLICATIONS

This application is a National Stage of International Application No. PCT/JP2023/036098 filed Oct. 3, 2023, claiming priority based on Japanese Patent Application No. 2022-160464 filed Oct. 4, 2022.

TECHNICAL FIELD

The present disclosure relates to a transmitting device, a receiving device, and a transmitting and receiving system.

BACKGROUND ART

Patent Literature 1 discloses an invention of a system for transmitting and receiving video data to display video on devices such as liquid crystal displays. The transmitting and receiving system detailed in this literature includes a transmitting device that sends video data, which includes both active and blank data, and a receiving device that receives the transmitted video data from the transmitting device to display the video on the video display device.

In this transmitting and receiving system, the transmitting device receives active data and blank data to be transmitted to the receiving device, along with a DE signal (data enable signal). The transmitting device transmits the active data to the receiving device during a period (active period) in which the DE signal is at a first level (for example, H level). The transmitting device transmits the blank data to the receiving device during a period (blanking period) in which the DE signal is at a second level (for example, L level).

Furthermore, the transmitting device sends BS data (blank start data) to the receiving device. This BS data indicates the timing (the start timing of the blanking period) of the DE signal transition from the first level to the second level. Moreover, the transmitting device sends BE data (blank end data) to the receiving device. This BE data indicates the timing (the end timing of the blanking period) of the DE signal transition from the second level to the first level.

The receiving device receives data sent via a transmission line from the transmitting device. From among such received data, the receiving device detects the BS data and the BE data, and reproduces the DE signal based on the timings at which these data are detected. In addition, based on the reproduced DE signal, the receiving device separates the received data into the active data and the blank data.

CITATION LIST

Patent Literature

Patent Literature 1: International Publication No. WO 2009/069430

SUMMARY OF INVENTION

Technical Problem

In the above transmitting and receiving system, there is a demand to transmit not only video data (active data, blank data) but also non-video data from the transmitting device to the receiving device. Here, non-video data refers to data different from video data, such as I2C data for device control, I2S data which is audio data, general-purpose input/output data, etc. If non-video data can be transmitted along with video data via a common transmission line, it is advantageous as it can suppress the increase in system cost.

When transmitting video data and non-video data from the transmitting device to the receiving device, it is necessary to transmit the video data in such a way that the video can be displayed without any issues on the receiving device side. In addition, the transmission of non-video data is required to have low latency and small latency variation so that there is no delay in the operation of devices using the non-video data on the receiving device side.

The present invention aims to provide a transmitting device, a receiving device, and a transmitting and receiving system that can transmit non-video data along with video data via a common transmission line and meet the above requirements.

Solution to Problem

A transmitting device of the present invention is configured to transmit video data including active data and blank data, and non-video data, wherein a data amount ratio of the video data to the non-video data to be transmitted is N or more, where N is a positive integer, the device includes a combiner configured to combine the video data and the non-video data; and a transmitter configured to transmit the data combined by the combiner.

The combiner is configured to input a DE signal indicating an active period for transmitting the active data and a blanking period for transmitting the blank data, the video data, and the non-video data; wherein the combiner includes: a first counter configured to count pulses of a reference clock, the first counter being initialized at a timing at which the DE signal indicates a transition from the blanking period to the active period and at a timing at which a count value reaches N; a second counter configured to count pulses of the reference clock, the second counter being initialized at a timing at which the count value reaches N; wherein the combiner is configured to insert the non-video data into the active data in a cycle of the reference clock in which the count value of the first counter is a first predetermined value during the active period; wherein the combiner is configured to insert the non-video data into the blank data in a cycle of the reference clock in which the count value of the second counter is a second predetermined value during the blanking period; wherein the combiner is configured to output combined data by coupling the video data and the non-video data.

The transmitter is configured to: input the combined data output from the combiner; insert BS data into the combined data in a cycle of the reference clock immediately after a timing at which the DE signal indicates a transition from the active period to the blanking period; insert BE data into the combined data in a cycle of the reference clock immediately before a timing at which the DE signal indicates a transition from the blanking period to the active period; and transmit the combined data after inserting the BS data and the BE data.

It is preferable that the combiner is configured to insert the count value of the second counter in the cycle in which the BS data is inserted, into a cycle following the cycle in which the BS data is inserted. It is preferable that the combiner is configured to insert the non-video data into a cycle that is two cycles after the cycle in which the BS data is inserted.

A receiving device of the present invention is configured to receive video data including active data and blank data, and non-video data, transmitted by a transmitting device based on a DE signal, wherein a data amount ratio of the video data to the non-video data to be received is N or more, where N is a positive integer, comprising: a receiver configured to receive data transmitted by the transmitting device; and a separator configured to separate the video data and the non-video data based on the data received by the receiver.

The receiver is configured to: receive data transmitted by the transmitting device; detect BS data and BE data included in the received data; and reproduce the DE signal indicating an active period and a blanking period based on the BS data and the BE data.

The separator is configured to input the data received by the receiver and the DE signal; wherein the separator includes: a first counter configured to count pulses of a reference clock, the first counter being initialized at a timing at which the DE signal indicates a transition from the blanking period to the active period and at a timing at which a count value reaches N; and a second counter configured to count pulses of the reference clock, the second counter being initialized at a timing at which the count value reaches N; wherein the separator is configured to separate the video data and the non-video data by: during the active period, identifying data corresponding to a cycle of the reference clock as non-video data when a count value of the first counter is a first predetermined value, and identifying data corresponding to other cycles as active data; and during the blanking period, identifying data corresponding to a cycle of the reference clock as non-video data when a count value of the second counter is a second predetermined value, and identifying data corresponding to other cycles as blank data.

It is preferable that the separator is configured to use data in a cycle following the cycle in which the BS data is detected as the count value of the second counter in the cycle in which the BS data is detected, to perform the counting operation of the second counter. It is preferable that the separator identifies data of a cycle that is two cycles after the cycle in which the BS data is detected as the non-video data.

A transmitting and receiving system of the present invention includes the above transmitting device of the present invention and the above receiving device of the present invention.

Effects of Invention

According to the present invention, non-video data can be transmitted along with video data via a common transmission line. Moreover, video can be displayed without any issues on the receiving device side, and delays in the operation of devices using non-video data on the receiving device side can be suppressed.

DESCRIPTION OF EMBODIMENTS

Figure 1:
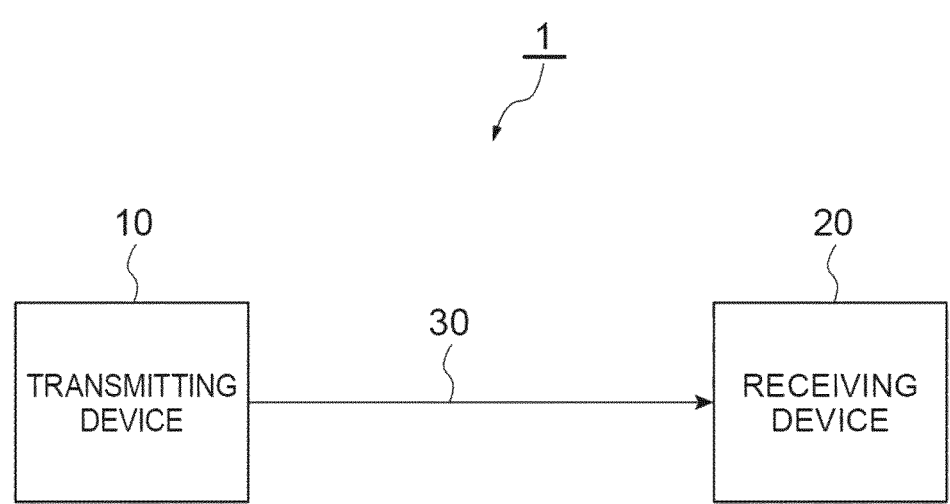
FIG. 1 is a diagram showing a configuration of a transmitting and receiving system 1.

Hereafter, embodiments for implementing the present invention will be described in detail with reference to the accompanying drawings. The same reference numbers are assigned to identical elements in the drawings, and repeated descriptions are omitted.

The inventors of the present invention considered improving the transmitting and receiving system described in Patent Literature 1 when developing a transmitting and receiving system that transmits non-video data along with video data (active data, blank data) from a transmitting device to a receiving device via a common transmission line. The inventors noted that the data amount Y of non-video data is smaller compared to the data amount X of video data to be transmitted.

The inventors considered setting the ratio of data amounts (X/Y) to be a positive integer N or more, setting the length of a unit period for transmitting video data to be N cycles of the reference clock, and setting the unit period for transmitting non-video data to be 1 cycle of the reference clock, and alternating these two unit periods, making the period of the reference clock N/(N+1) times compared to when non-video data is not transmitted. Such a transmitting and receiving system is expected to be able to transmit non-video data along with video data via a common transmission line, display video without any issues on the receiving device side, and suppress delays in the operation of devices using non-video data on the receiving device side.

By the way, as described above, in the transmitting and receiving system described in Patent Literature 1, the transmitting device sends BS data or BE data to the receiving device at the timing of the level transition of the DE signal (transition between the active period and the blanking period). The receiving device detects the BS data and the BE data from among the received data, and reproduces the DE signal based on the timings at which these data are detected. The receiving device then separates the received data into the active data and the blank data based on the reproduced DE signal.

Since the screen for displaying video is generally rectangular and the amount of active data for each line of video is constant, the length of the period (active period) in which the DE signal is at H level is a constant time. Therefore, if the length of the period in which the reproduced DE signal is at H level differs from a predetermined constant time, the receiving device can determine that the received data is missing due to external causes such as static electricity, and further improve EMC immunity by taking measures such as data correction.

However, the inventors found that when alternating the N-cycle unit period for transmitting video data and the 1-cycle unit period for transmitting non-video data, the following problem may arise. Namely, if priority is given to complying with sending BS data or BE data from the transmitting device to the receiving device at the timing of the level transition of the DE signal, the length of the period (active period) in which the DE signal is at H level may vary depending on the timing of inserting non-video data. If the length of the period in which the DE signal is at H level varies regardless of external causes such as static electricity, it is impossible to determine whether the received data is missing due to external causes such as static electricity in the receiving device. Such a transmitting and receiving system is not suitable for application in fields where higher EMC immunity is required.

The transmitting and receiving system 1 described below can solve the above problems. FIG. 1 is a diagram showing the configuration of the transmitting and receiving system 1. The transmitting and receiving system 1 comprises a transmitting device 10 and a receiving device 20. The transmitting device 10 transmits video data (active data, blank data) and non-video data to a transmission line 30. The receiving device 20 receives the data output from the transmitting device 10 via the transmission line 30 and separates the received data into video data and non-video data. The receiving device 20 outputs the video data to a video display device such as a liquid crystal display device and the non-video data to devices using the non-video data.

Figure 2:
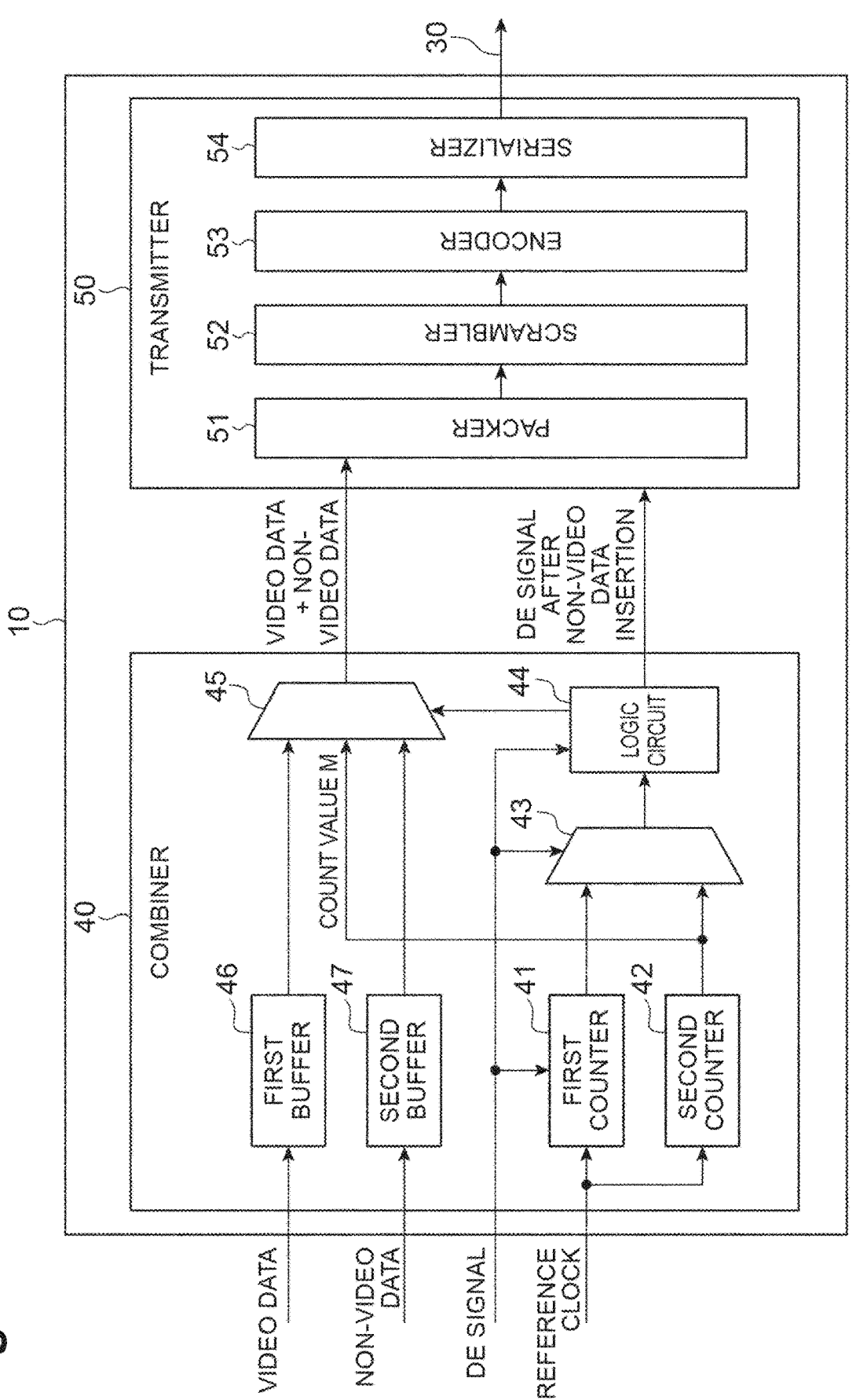
FIG. 2 is a diagram showing a configuration of a transmitting device 10.

FIG. 2 is a diagram showing the configuration of the transmitting device 10. The transmitting device 10 comprises a combiner 40 and a transmitter 50. The combiner 40 inputs a DE signal, video data (active data, blank data), and non-video data, combines the video data and the non-video data, and outputs combined data. The transmitter 50 receives the combined data output from the combiner 40, inserts BS data and BE data into the combined data, and then sends the modified combined data to the transmission line 30.

The combiner 40 includes a first counter 41, a second counter 42, a selector 43, a logic circuit 44, a multiplexer 45, a first buffer 46, and a second buffer 47.

Each of the first counter 41 and the second counter 42 counts pulses of the reference clock, and the count value is initialized at a timing at which the count value reaches N. Namely, the count value of each of the first counter 41 and the second counter 42 is within the range from 0 to N−1. Also, the first counter 41 is initialized at a timing at which the DE signal indicates a transition from the blanking period to the active period. The second counter 42 outputs the count value M to the multiplexer 45 in the cycle immediately after the timing at which the DE signal transitions from H level to L level.

The selector 43 receives the count values from both the first counter 41 and the second counter 42, as well as the DE signal. The selector 43 selects and outputs the count value of the first counter 41 during the active period in which the DE signal is at H level, and selects and outputs the count value of the second counter 42 during the blanking period in which the DE signal is at L level.

The logic circuit 44 receives the count value selected and output by the selector 43 and the DE signal. During the active period in which the DE signal is at H level, the logic circuit 44 outputs a signal to the multiplexer 45, indicating that the value output from the selector 43 (the count value of the first counter 41) is a first predetermined value N1. During the blanking period in which the DE signal is at L level, the logic circuit 44 outputs a signal to the multiplexer 45, indicating that the value output from the selector 43 (the count value of the second counter 42) is a second predetermined value N2. N1 and N2 may be any integer values in the range from 0 to N−1, and they may be equal or different values. The signal output from the logic circuit 44 to the multiplexer 45 indicates the cycle of the reference clock in which non-video data is inserted into the video data. The logic circuit 44 outputs the DE signal after non-video data is inserted into the video data to the transmitter 50.

The first buffer 46 inputs and temporarily stores the video data. The second buffer 47 inputs and temporarily stores the non-video data. Each of the first buffer 46 and the second buffer 47 may be a FIFO memory.

The multiplexer 45 reads and inputs the video data stored in the first buffer 46 and the non-video data stored in second buffer 47. The multiplexer 45 also inputs the signal (the signal indicating the cycle of the reference clock in which non-video data is inserted into the video data) output from the logic circuit 44 and the count value M of the second counter 42 in the cycle immediately after the timing at which the DE signal transitions from H level to L level. The multiplexer 45 inserts the non-video data into the video data based on the signal output from the logic circuit 44. The multiplexer 45 inserts the count value M in the cycle two cycles after the timing at which the DE signal transitions from H level to L level. The multiplexer 45 outputs the combined data, obtained by combining these data, to the transmitter 50.

The transmitter 50 includes a packer 51, a scrambler 52, an encoder 53, and a serializer 54. The packer 51 inputs the combined data (video data+non-video data) output from the multiplexer 45 of the combiner 40, performs packet processing on this combined data, and outputs the data after packet processing to the scrambler 52. The scrambler 52 has a random number generator and uses the random number generated by this random number generator to perform scrambling processing on the data output from the packer 51 and outputs it. The encoder 53 performs encoding processing using a symbol mapping method (e.g., 8B10B encoding) and encodes the data output from the scrambler 52 and outputs it. The serializer 54 inputs the data output from the encoder 53, converts this data (parallel data) into serial data, and sends it to the transmission line 30.

The transmitter 50 also inputs the DE signal output from the logic circuit 44 of the combiner 40. The transmitter 50 inserts BS data (blank start data) into the combined data in a cycle of the reference clock immediately after a timing at which the DE signal indicates a transition from the active period to the blanking period, and inserts BE data (blank end data) into the combined data in a cycle of the reference clock immediately before a timing at which the DE signal indicates a transition from the blanking period to the active period. The transmitter 50 performs the above processing of the packer 51, the scrambler 52, the encoder 53, and the serializer 54 on the combined data after inserting the BS data and the BE data. At this time, the encoder 53 treats the BS data and the BE data as K-codes among the 8B10B encodings, and treats other data as D-codes among the 8B10B encodings.

Both D-code and K-code encode 8-bit data into 10-bit data. In other words, in both D-code and K-code, 8 bits of information correspond to 10-bit symbols. In general, 8-bit data can represent 256 (=$2^8$) possible values, whereas 10-bit data can represent 1024 (=$2^{10}$) possible values. D-code encodes all 8-bit data into 10-bit data, whereas K-code encodes twelve specific 8-bit data sets into 10-bit data. Therefore, the 10-bit data which can represent 1024 possible values can include 10-bit data generated by the D-codes and 10-bit data generated by the K-codes.

For instance, in binary notation for both the 8-bit data and 10-bit data, the 8-bit data [0001_1100] corresponds to [00_1111_0100] and [11_0000_1011] in 10-bit K-code data, and to [00_1110_1011] and [00_1110_0100] in 10-bit D-code data. Thus, even if the 8-bit data are the same, the 10-bit data in K-code differs from 10-bit data in D-code. Because no 10-bit data in K-code ever matches any 10-bit data in D-code, it is possible to identify whether any given 10-bit data is a K-code or a D-code.

Figure 3:
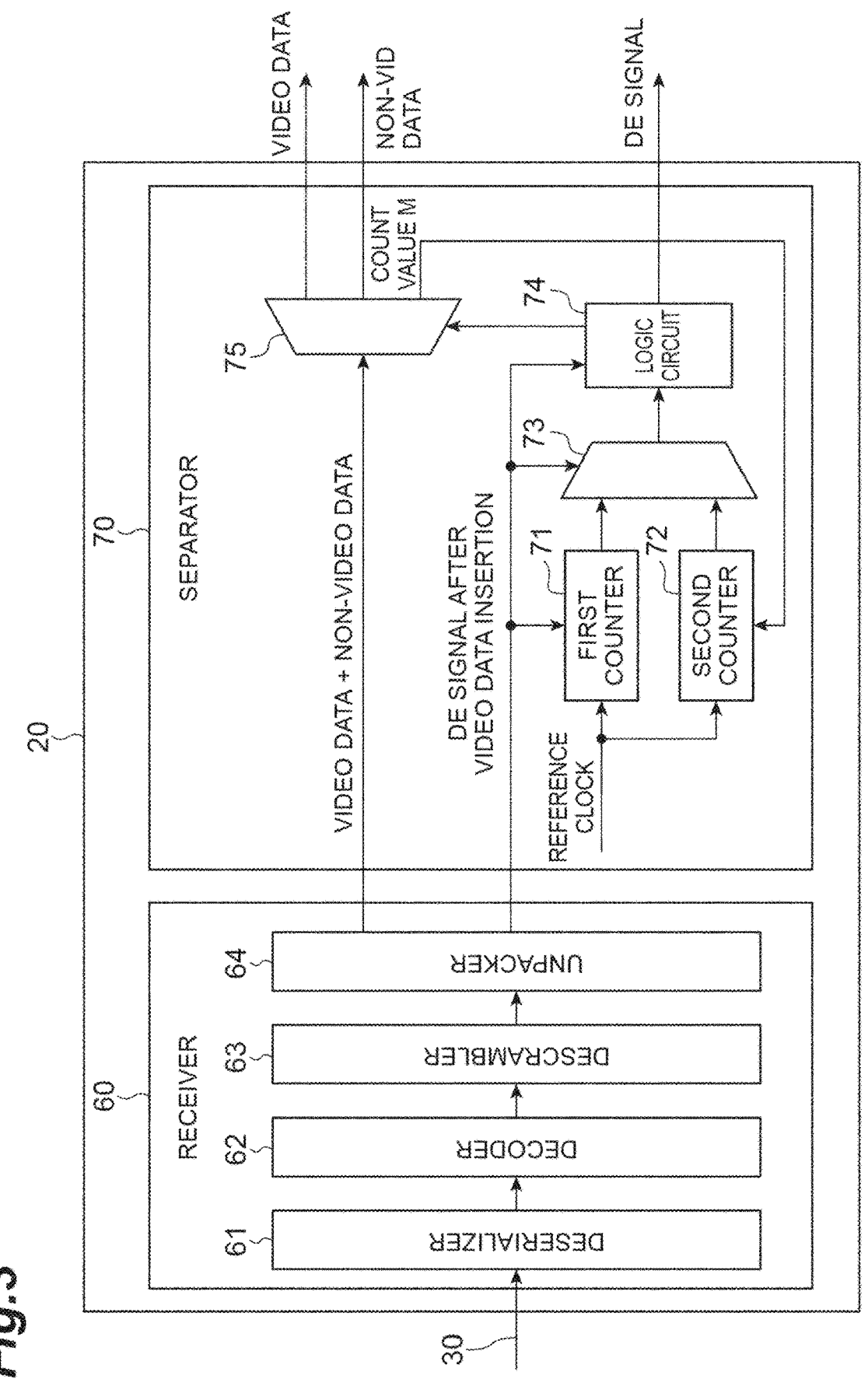
FIG. 3 is a diagram showing a configuration of a receiving device 20.

FIG. 3 is a diagram showing the configuration of the receiving device 20. The receiving device 20 comprises a receiver 60 and a separator 70. The receiver 60 receives data sent from the transmitter 50 of the transmitting device 10 via the transmission line 30. The separator 70 separates the video data and the non-video data based on the data received by the receiver 60.

The receiver 60 includes a deserializer 61, a decoder 62, a descrambler 63, and an unpacker 64. The deserializer 61 converts the data (serial data) sent from the transmitting device 10 into parallel data and outputs it. The decoder 62 decodes the data output from the deserializer 61 and outputs it. The descrambler 63 descrambles the data output from the decoder 62 and outputs it. The unpacker 64 unpacks the data output from the decoder 62 and outputs it.

The receiver 60 also detects the BS data and the BE data included in the received data during the above processing of the deserializer 61, the decoder 62, the descrambler 63, and the unpacker 64, and reproduces the DE signal indicating the active period and the blanking period based on the BS data and the BE data.

Note that the configuration of the transmitter 50 and the receiving section 60 (packer, scrambler, encoder, serializer) is similar to the device configuration disclosed in U.S. Pat. No. 8,780,932 corresponding to Patent Literature 1, and can be incorporated by reference as needed.

The separator 70 includes a first counter 71, a second counter 72, a selector 73, a logic circuit 74, and a demultiplexer 75.

Each of the first counter 71 and the second counter 72 counts pulses of the reference clock, and the count value is initialized at a timing at which the count value reaches N. Namely, the count value of each of the first counter 71 and the second counter 72 is within the range from 0 to N−1. Also, the first counter 71 is initialized at a timing at which the DE signal indicates a transition from the blanking period to the active period.

The selector 73 receives the count values from both the 1st counter 71 and the 2nd counter 72, as well as the DE signal. The selector 73 selects and outputs the count value of the first counter 71 during the active period in which the DE signal is at H level, and selects and outputs the count value of the second counter 72 during the blanking period in which the DE signal is at L level.

The logic circuit 74 inputs the count value selected and output by the selector 73 and the DE signal. During the active period in which the DE signal is at H level, the logic circuit 74 outputs a signal indicating that the value output from the selector 73 (the count value of the first counter 71) is a first predetermined value N1 to the demultiplexer 75. During the blanking period in which the DE signal is at L level, the logic circuit 74 outputs a signal indicating that the value output from the selector 73 (the count value of the second counter 72) is a second predetermined value N2 to the demultiplexer 75. N1 and N2 in the logic circuit 74 are the same values as N1 and N2 in the logic circuit 44, respectively. The signal output from the logic circuit 74 to the demultiplexer 75 indicates the cycle of the reference clock in which non-video data is inserted into the video data.

The demultiplexer 75 inputs the combined data (video data+non-video data) output from the receiver 60 and the signal output from the logic circuit 74. The demultiplexer 75 separates the combined data into video data and non-video data based on the signal output from the logic circuit 74.

Namely, during the active period when the DE signal is at the H level, the demultiplexer 75 identifies the data received by the receiver 60 as non-video data in the cycle of the reference clock where the count value of the first counter 71 is the first predetermined value N1, and identifies the data in other cycles as active data. During the blanking period when the DE signal is at the L level, the demultiplexer 75 identifies the data received by the receiver 60 as non-video data in the cycle of the reference clock where the count value of the second counter 72 is the second predetermined value N2, and identifies the data in other cycles as blank data.

Furthermore, the demultiplexer 75 uses the data from the cycle following the cycle in which the BS data is detected as the count value of the second counter 72 in the cycle in which the BS data is detected, to perform the counting operation of the second counter 72. This allows the second counter 42 of the transmitting device 10 and the second counter 72 of the receiving device 20 to output the same count value.

Figure 4:
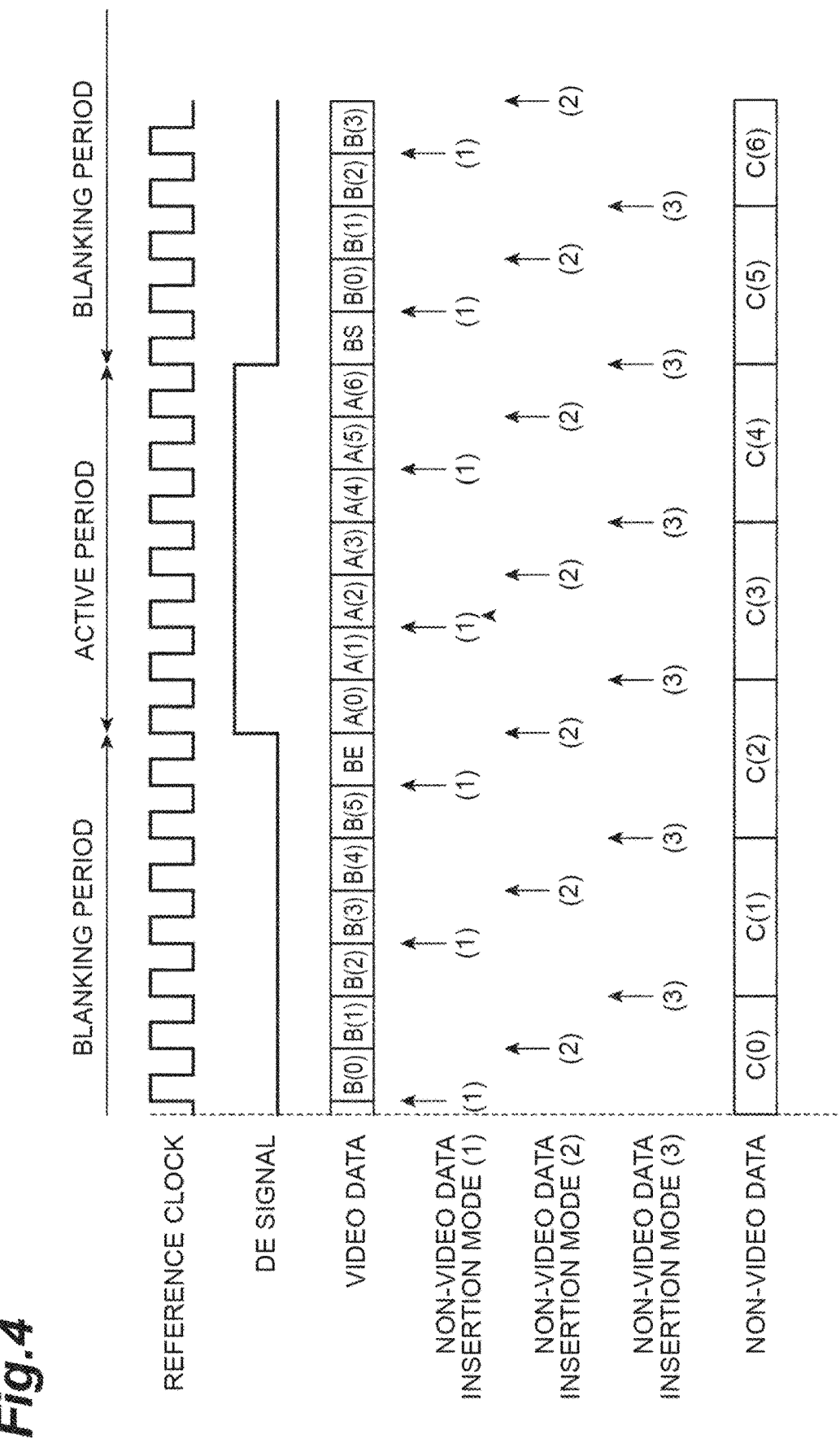
FIG. 4 is a timing chart explaining an example of a mode of inserting non-video data into video data.

FIG. 4 is a timing chart explaining an example of a mode of inserting non-video data into video data. This figure shows a case where the N-cycle unit period for transmitting video data and the 1-cycle unit period for transmitting non-video data are simply alternated. Here, N=3. When N=3, there are three modes of inserting non-video data into video data. This figure shows, from top to bottom, the reference clock, the DE signal, the video data (active data A, blank data B), the insertion positions of non-video data in each of the non-video data insertion modes (1) to (3), and the non-video data C.

In each of the non-video data insertion modes (1) to (3), if non-video data is simply inserted at the positions indicated by the upward arrows, the length of the period (active period) in which the DE signal is at H level may vary depending on the non-video data insertion mode. If the length of the period in which the DE signal is at H level varies regardless of external causes such as static electricity, it is impossible to determine whether the received data is missing due to external causes such as static electricity in the receiving device. Such a transmitting and receiving system is not suitable for application in fields where higher EMC immunity is required.

In the transmitting and receiving system 1 of this embodiment, the N-cycle unit period for transmitting video data and the 1-cycle unit period for transmitting non-video data are basically alternated, and the non-video data insertion modes are made different between the active period and the blanking period to solve the above problems.

Figure 5:
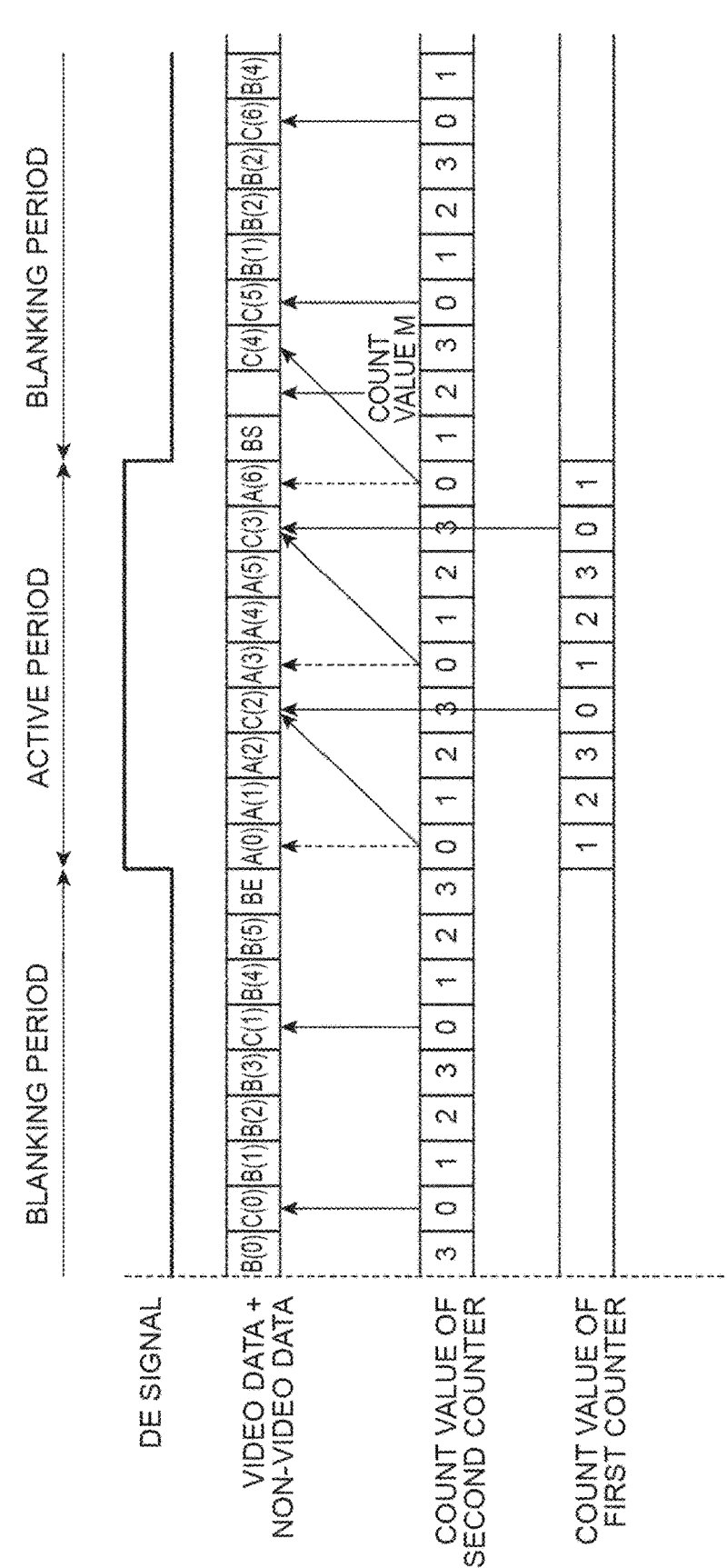
FIG. 5 is a timing chart explaining a mode of inserting non-video data into video data in the transmitting and receiving system 1.
Figure 6:
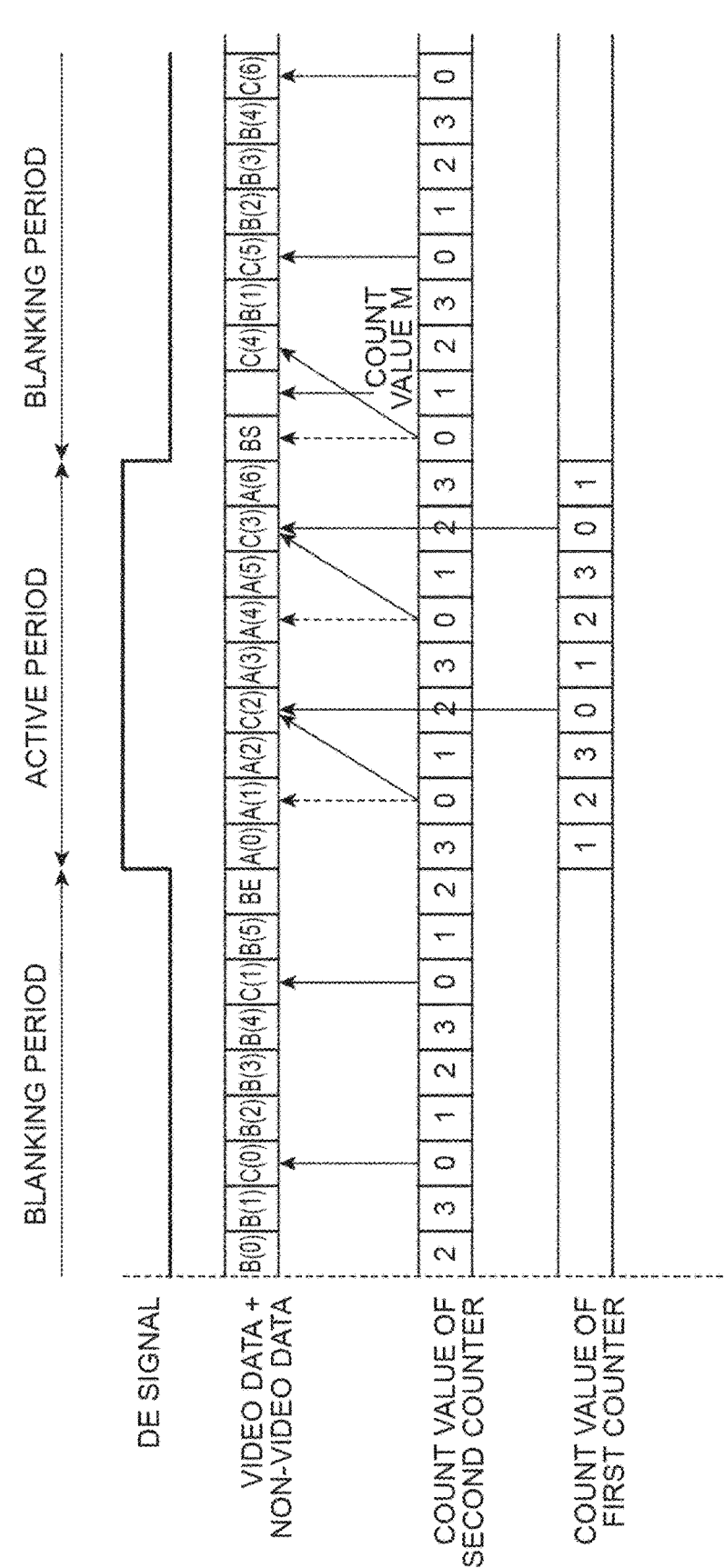
FIG. 6 is a timing chart explaining a mode of inserting non-video data into video data in the transmitting and receiving system 1.
Figure 7:
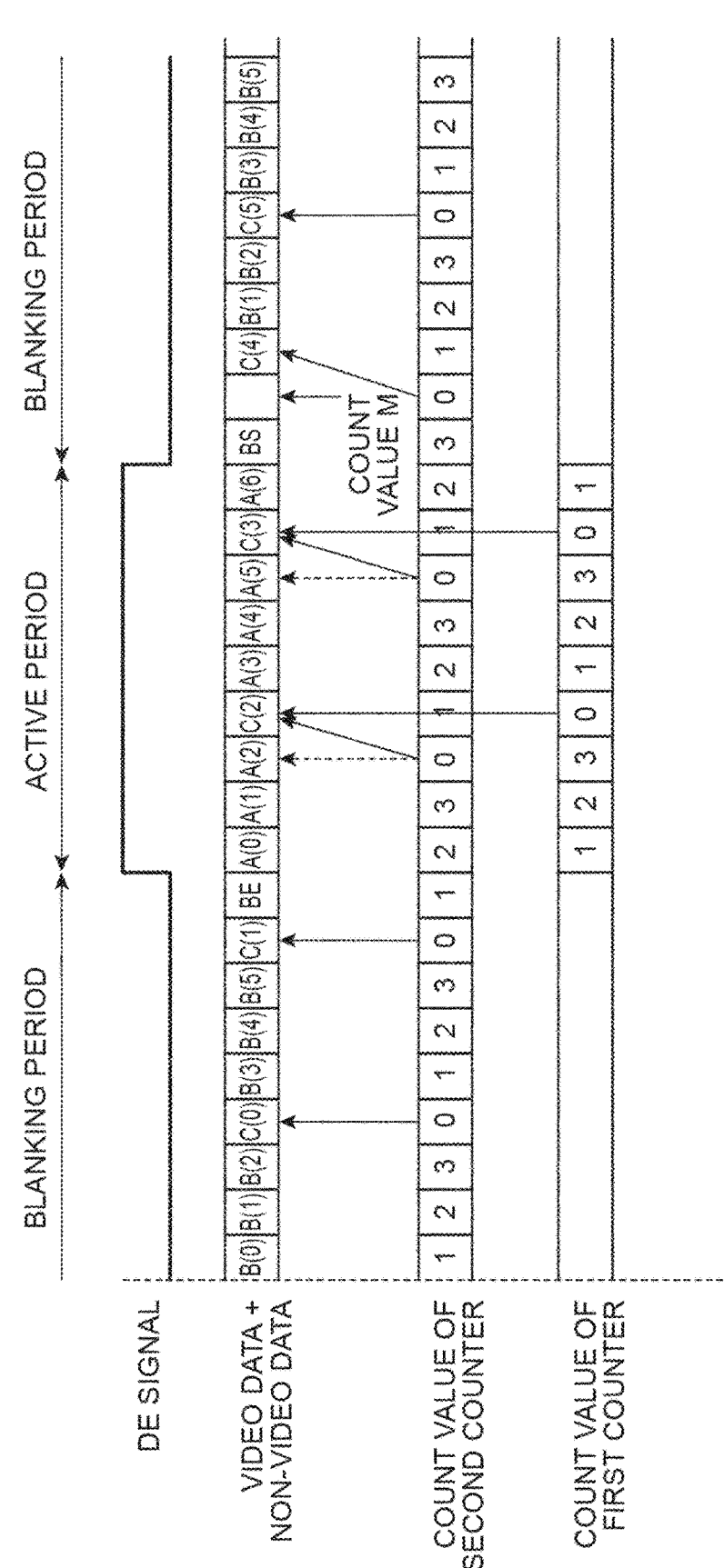
FIG. 7 is a timing chart explaining a mode of inserting non-video data into video data in the transmitting and receiving system 1.

FIGS. 5 to 7 are timing charts explaining modes of inserting non-video data into video data in the transmitting and receiving system 1. Here, N=3. Also, both the first predetermined value N1 of the first counter 41 and the second predetermined value N2 of the second counter 42, which indicate the insertion positions of the non-video data, are set to 0. These figures show, from top to bottom, the DE signal, the combined data (video data+non-video data), the count value of the second counter 42, and the count value of the first counter 41. The mode shown in FIG. 5 is a modification of the non-video data insertion mode (1) shown in FIG. 4. The mode shown in FIG. 6 is a modification of the non-video data insertion mode (2) shown in FIG. 4. The mode shown in FIG. 7 is a modification of the non-video data insertion mode (3) shown in FIG. 4.

In each of the non-video data insertion modes shown in FIGS. 5 to 7, during the active period in which the DE signal is at H level, the non-video data C is inserted into the active data A in a cycle in which the count value of the first counter 41 is 0. During the blanking period in which the DE signal is at L level, the insertion of BS data in the first cycle and the insertion of BE data in the last cycle are given top priority, and the non-video data C is basically inserted into the blank data B in a cycle in which the count value of the second counter 42 is 0. In addition to this basic rule, the count value M is inserted in the cycle following the cycle in which the BS data is inserted. Furthermore, the non-video data C is inserted in the cycle following the cycle in which the count value M is inserted. The count value M is the count value of the second counter 42 in the cycle immediately after the timing at which the DE signal transitions from H level to L level (i.e., the cycle in which the BS data is inserted).

Since both the first counter 41 of the transmitting device 10 and the first counter 71 of the receiving device 20 are initialized at a timing at which the DE signal indicates a transition from the blanking period to the active period, they can output the same count value. The second counter 72 of the receiving device 20 uses the data in the cycle following the cycle in which the BS data is detected as the count value of the second counter 72 in the cycle in which the BS data is detected, so it can output the same count value as the second counter 42 of the transmitting device 10. The transmitting device 10 and the receiving device 20 share the values of N, N1, and N2, and share the non-video data insertion rules.

By doing so, the receiving device 20 that has received the data sent from the transmitting device 10 can detect the BS data and the BE data, reproduce the DE signal, and separate the video data and the non-video data. Moreover, since the N-cycle unit period for transmitting video data and the 1-cycle unit period for transmitting non-video data are basically alternated, video can be displayed without any issues on the receiving device 20 side, and delays in the operation of devices using non-video data on the receiving device 20 side can be suppressed. Furthermore, since the length of the period in which the DE signal is at H level can be set to a predetermined constant time, if the length of that period differs from the predetermined constant time, it can be determined that the received data is missing due to external causes such as static electricity, and further improve EMC immunity by taking measures such as data correction.

The present invention is not limited to the above examples and is defined by the scope of the claims, with the intention that all modifications within the meaning and range equivalent to the claims are included.

REFERENCE SIGNS LIST

1 . . . transmitting and receiving system; 10 . . . transmitting device; 20 . . . receiving device; 30 . . . transmission line; 40 . . . combiner; 41 . . . first counter; 42 . . . second counter; 43 . . . selector; 44 . . . logic circuit; 45 . . . multiplexer; 46 . . . first buffer; 47 . . . second buffer; 50 . . . transmitter section; 51 . . . packer; 52 . . . scrambler; 53 . . . encoder; 54 . . . serializer; 60 . . . receiver; 61 . . . deserializer; 62 . . . decoder; 63 . . . descrambler; 64 . . . unpacker; 70 . . . separator; 71 . . . first counter; 72 . . . second counter; 73 . . . selector; 74 . . . logic circuit; 75 . . . demultiplexer.

The invention claimed is:

1. A transmitting device configured to transmit video data including active data and blank data, and non-video data, wherein a data amount ratio of the video data to the non-video data to be transmitted is N or more, where N is a positive integer, the device comprising:

a combiner configured to combine the video data and the non-video data; and a transmitter configured to transmit the data combined by the combiner, wherein the combiner is configured to input a data enable (DE) signal indicating an active period for transmitting the active data and a blanking period for transmitting the blank data, the video data, and the non-video data;

wherein the combiner includes:

a first counter configured to count pulses of a reference clock, and initialized at a timing at which the DE signal indicates a transition from the blanking period to the active period and at a timing at which a count value reaches N;

a second counter configured to count pulses of the reference clock, and initialized at a timing at which the count value reaches N;

wherein the combiner is configured to insert the non-video data into the active data in a cycle of the reference clock in which the count value of the first counter is a first predetermined value during the active period;

wherein the combiner is configured to insert the non-video data into the blank data in a cycle of the reference clock in which the count value of the second counter is a second predetermined value during the blanking period;

wherein the combiner is configured to output combined data by coupling the video data and the non-video data; and wherein the transmitter is configured to:

input the combined data output from the combiner;

insert blank start (BS) data into the combined data in a cycle of the reference clock immediately after a timing at which the DE signal indicates a transition from the active period to the blanking period;

insert blank end (BE) data into the combined data in a cycle of the reference clock immediately before a timing at which the DE signal indicates a transition from the blanking period to the active period; and transmit the combined data after inserting the BS data and the BE data.

2. The transmitting device according to claim 1, wherein the combiner is configured to insert the count value of the second counter in the cycle in which the BS data is inserted, into a cycle following the cycle in which the BS data is inserted.

3. The transmitting device according to claim 2, wherein the combiner is configured to insert the non-video data into a cycle that is two cycles after the cycle in which the BS data is inserted.

4. A receiving device configured to receive video data including active data and blank data, and non-video data, transmitted by a transmitting device based on a data enable (DE) signal, wherein a data amount ratio of the video data to the non-video data to be received is N or more, where N is a positive integer, comprising:

a receiver configured to receive data transmitted by the transmitting device; and a separator configured to separate the video data and the non-video data based on the data received by the receiver, wherein the receiver is configured to:

receive data transmitted by the transmitting device;

detect blank start (BS) data and blank end (BE) data included in the received data; and reproduce the DE signal indicating an active period and a blanking period based on the BS data and the BE data, wherein the separator is configured to input the data received by the receiver and the DE signal;

wherein the separator includes:

a first counter configured to count pulses of a reference clock, and initialized at a timing at which the DE signal indicates a transition from the blanking period to the active period and at a timing at which a count value reaches N; and a second counter configured to count pulses of the reference clock, and initialized at a timing at which the count value reaches N;

wherein the separator is configured to separate the video data and the non-video data by:

during the active period, identifying data corresponding to a cycle of the reference clock as non-video data when a count value of the first counter is a first predetermined value, and identifying data corresponding to other cycles as active data; and during the blanking period, identifying data corresponding to a cycle of the reference clock as non-video data when a count value of the second counter is a second predetermined value, and identifying data corresponding to other cycles as blank data.

5. The receiving device according to claim 4, wherein the separator is configured to use data in a cycle following the cycle in which the BS data is detected as the count value of the second counter in the cycle in which the BS data is detected, to perform the counting operation of the second counter.

6. The receiving device according to claim 5, wherein the separator identifies data of a cycle that is two cycles after the cycle in which the BS data is detected as the non-video data.

7. A transmitting and receiving system comprising:

the transmitting device according to claim 1; and a receiving device, wherein the receiving device is configured to receive video data including active data and blank data, and non-video data, transmitted by the transmitting device based on a data enable (DE) signal;

wherein a data amount ratio of the video data to the non-video data to be received is N or more, where N is a positive integer, wherein the receiving device comprises:

a receiver configured to receive data transmitted by the transmitting device;

a separator configured to separate the video data and the non-video data based on data received by the receiver;

wherein the receiver is configured to:

receive data transmitted by the transmitting device;

detect blank start (BS) data and blank end (BE) data included in the received data; and reproduce the DE signal indicating an active period and a blanking period based on the BS data and the BE data, wherein the separator is configured to input the data received by the receiver and the DE signal;

wherein the separator includes:

a first counter configured to count pulses of a reference clock, and initialized at a timing at which the DE signal indicates a transition from the blanking period to the active period and at a timing at which a count value reaches N;

a second counter configured to count pulses of the reference clock, and initialized at a timing at which the count value reaches N;

wherein the separator is configured to separate the video data and the non-video data by:

during the active period, identifying data corresponding to a cycle of the reference clock as non-video data when a count value of the first counter is a first predetermined value, and identifying data corresponding to other cycles as active data; and during the blanking period, identifying data corresponding to a cycle of the reference clock as non-video data when a count value of the second counter is a second predetermined value, and identifying data corresponding to other cycles as blank data.

8. The transmitting and receiving system according to claim 7, wherein the combiner of the transmitting device is configured to insert the count value of the second counter in the cycle in which the BS data is inserted, into a cycle following the cycle in which the BS data is inserted; and wherein the separator of the receiving device is configured to use data in a cycle following the cycle in which the BS data is detected as the count value of the second counter in the cycle in which the BS data is detected, to perform the counting operation of the second counter.

9. The transmitting and receiving system according to claim 8, wherein the combiner of the transmitting device is configured to insert the non-video data in a cycle that is two cycles after the cycle in which the BS data is inserted, and wherein the separator of the receiving device is configured to identify data in a cycle that is two cycles after the cycle in which the BS data is detected as the non-video data.

* * * * *